Oct. 16, 1956 A. R. McCLOSKEY 2,767,034
SELF-ALIGNING BEARINGS
Filed May 7, 1953
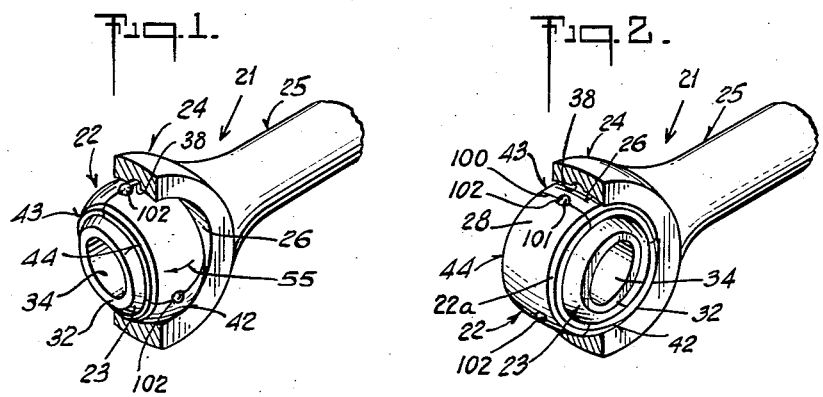
INVENTOR:
ALBERT R. McCLOSKEY
BY
Watson Johnson Leavenworth + Blair
ATTORNEYS:

United States Patent Office 2,767,034
Patented Oct. 16, 1956

2,767,034

SELF-ALIGNING BEARINGS

Albert Richard McCloskey, Fairfield, Conn., assignor to The Heim Company, Fairfield, Conn., a corporation of Connecticut Application May 7, 1953, Serial No. 353,485

1 Claim. (Cl. 308—72)

The present invention relates to self-aligning bearings of the ball seat type, employable as a bearing for supporting heavy rotating, oscillating and/or static loads and as ball joint connections, couplings for tie rods, drag links, cables, etc., such as, for example, the types illustrated in Heim U. S. Patents Nos. 2,400,506 and 2,366,668.

General objects of the present invention are to provide such bearings which are readily and economically constructed and assembled on a commercial basis while assuring long and effective service under the currently increased load and speed conditions with minimum wear and reduced tendency to develop such looseness as requires repair or replacement; and a unique method of assembling the parts thereof.

A more specific object of the present invention is to provide such self-aligning bearing structure which permits ready assembly of a unitary bearing ball in a casing or eye means or member with an intervening sectioned ring, bushing or race, thereby extending the use to which the ball may be put and facilitating mounting to the latter of connecting shaft, pin, rod or stem means.

Another object of the present invention is the simplification of manufacturing procedures by making unnecessary any sectioning of the ball or casing elements while permitting ready precision production of the intervening race means in mating or matching sections which facilitate assembly of parts without sacrificing strength, sturdiness and long life.

A further object is to provide a commercially practicable and efficient method of making such bearings and assembling the parts thereof.

Other objects of the invention will in part be obvious and will in part appear hereinafter.

The invention accordingly comprises the features of construction, combinations of elements, arrangement of parts, and the steps and the relation of one or more of such steps with respect to each of the others, all as are exemplified in the following detailed disclosure, and the scope of this invention will be indicated in the claim.

For a fuller understanding of the nature and objects of the invention, reference should be had to the following detailed description taken in connection with the accompanying drawings, in which:

Fig. 1 is a perspective view with parts broken away of one embodiment of my bearing, including a casing ring, in which is installed a race ring and ball in their initial installation position; and Fig. 2 is a perspective view similar to Fig. 1, but showing the race ring and ball reoriented into their final assembled position within the casing ring.

Referring to the drawings, in which like numerals identify similar parts throughout, it will be seen from Figs. 1 and 2, that an embodiment of the present invention may comprise a casing or eye means or member 21, a sectioned race ring 22 and a bearing ball 23. The casing or eye means or member 21 preferably is in the form of a one-piece casing ring or head 24, and may include an integral shank 25.

The casing ring 24 is provided with a through bore, the walls of which are defined by a circular, axially-arcuate, concave seating surface or groove 26 which substantially coincides to the surface of a spherical segment with the defining parallel planes thereof located substantially equidistant on opposite sides of the equatorial plane, i. e., a spherical medial zone.

The sectioned race ring 22 may be a hardened steel bushing, or made of other suitable material, and comprises a plurality of segments aligned end-to-end having an external convex seating surface 28 substantially complementary to the internal concave seating surface 26 of the casing ring 24 and mateable therewith. The assembled race ring 22 also has an internal, axially-arcuate, concave bearing surface which coincides with the surface of a spherical medial zone.

The bearing ball 23 may be of hardened steel or other suitable bearing material and may be in the form of a sphere ground off at opposite poles to provide substantially flat ends 32, 32 with an intervening external bearing surface. Preferably the ball 23 is provided with a through bore 34 extending from the opposite ends 32, 32 and adapted to receive a shaft, connector stem, rod or pin or the like (not shown).

In accordance with the present invention, the race ring 22 is transversely sectioned to comprise a plurality of segments, e. g. three segments 42, 43 and 44, which are to be assembled together in end-to-end alignment within the casing ring 24. Such segments may be formed as fractured parts of a previously fabricated race ring. Since the juxtaposed ends of the race ring segments should match in order that the dimensions of the assembled race ring conform to predetermined values, the segments should be assembled in the same order and orientation as when they were made by fracturing a finished one-piece race ring. The fracturing of the fabricated race ring 22 may be readily accomplished by forming notches or cuts in the vicinity of the intended lines of fracture and a tapered fracturing wedge may be driven into the ring to accomplish the fracturing of the ring. As a result, the ring will be fractured transversely at the notches. It is to be understood that in accordance with the present invention any plurality of race ring segments, which will permit the assembly procedure hereinafter described, may be used, although it has been found that three such segments are quite satisfactory to the production and assembly of self-aligning bearings of the type illustrated in the drawings. For example, the race ring may comprise two segments, one of which extends through an arc of 240°, for example, and the other of which is of 120° extent.

A suitable method of assembly of the eye 24, the bearing ball 23 and the interposed sectioned race ring 22 may be accomplished as follows: the ball 23 is moved into the bore of the eye 24 and orientated to expose a portion of its external bearing surface at one end of the eye. Any selected race ring segment, such as 42, is then moved to apply its internal bearing surface 29 to the exposed portion of the external bearing surface 33 of the ball 23. The ball 23 and the applied segment 42 are then turned or rotated within the eye 24 so as to juxtapose the external seating surface 28 of the segment adjacent to a portion of the internal seating surface 26 of the eye and with an adjacent portion of the ball bearing surface 33 exposed at the end of the eye.

The next succeeding segment, such as 43, is then applied to the exposed portion of the ball bearing surface 33 in the same manner.

Thereafter, the ball 23 with the two applied segments 42 and 43 will then again be turned so as to juxtapose the last applied segment 43 to the internal seating surface 26 of the eye 24. Then, the last segment 44 is applied to the remaining exposed portion of the ball bearing surface 33 to fill in the gap between the ends of the segments 42 and 43.

The thus assembled race ring segments on the ball 23 are in a general plane disposed at an appreciable angle, such as substantially normal, to the general plane of the eye 24. The relative positions of the parts at this intermediate stage of assembly is illustrated in Fig. 1, wherein it is indicated by the arrow 55 that the ball 23 and the assembled race ring 22 are then to be swung in the seating surface 26 of the eye 24. By such swinging or reorientation of the assembled sectioned race ring 22, it is then brought to substantial alignment with the eye 24, with the external seating surface 28 of the assembled race ring mating with the internal seating surface 26 of the eye.

It is to be understood that by virtue of the axial curvature of the internal seating surface 26 of the eye 24 and the external seating surface 28 of the assembled race ring 22, the eye bore at the ends of the casing ring is of a diameter less than the greatest diameter of the race ring. Thus only by such assembly of the race ring segments in a general plane disposed at an appreciable angle to the general plane of the eye may the assembled race ring be inserted into the eye. These same features assure that the race ring will be securely held in the eye when they are brought to substantial alignment.

As noted hereinbefore, the race ring may comprise two segments, one of 240° and the other of 120°. The same general method of assembly as hereinbefore described may be employed in installing such a two-segment ring. However, any suitable method of assembly may be employed.

The internal seating surface 26 of the eye 24 and the external seating surface 28 of the assembled race ring 22 may function as bearing surfaces, under certain circumstances, and in various embodiments of the invention it is intended that they be capable of relative rotation. Accordingly, although those seating surfaces must be of such relative dimensions and curvature as to mate, they may fit with such accuracy as to provide bearing surfaces. Also, although the particular successive steps of assembly described may be preferred, variations thereof, which are characterized by the fundamental features, may be employed in assembly of the bearing ball, the sectioned race ring and the eye. For example, if the race ring segments are of a length less than the diameter of the ends of the eye bore, a segment may be applied to the ball bearing surfaces before the ball is inserted into the eye bore. Likewise, more than one race ring segment may be applied to the ball bearing surface before insertion of the ball into the eye bore provided the thickness of the race ring segments plus the diameter of the ball bearing surface be less than the diameter of the ends of the eye bore, in which case a gap provided by the omission of one or more of the race ring segments permits and facilitates insertion of the ball with applied segments into the eye. In the latter case the ball and the carried segments would then be turned in the eye to expose the gap at one end of the eye for insertion of the final segment. In any event, the relative dimensions of the parts must be such that at least the ball 23 alone is receivable through at least one end of the eye bore so as to permit practice of the assembly procedure herein taught.

After the ball and assembled race have been mounted in this fashion in the casing ring or eye, suitable means to hold the assembled race ring in substantial alignment with the eye should be employed.

Under certain circumstances it may be desirable to lock the race ring segments in substantial alignment within the eye, by so machining the outer diameter of the race ring and the inner diameter of the casing ring or eye, as to provide what might be termed an interference fit therebetween. For example, if the inner diameter of the casing ring or eye is machined to .750 inch, and the outer diameter of the race ring is similarily dimensioned, the race ring segments when pushed into place in the ring, in the manner hereinbefore described, will fit rather tightly so as to preclude subsequent misalignment of the segments. Then again, the opposite outer edges of the ring may be chamfered, as indicated at 22a so that the metal of the casing ring or eye may be staked or swaged over such chamfers, thus securely locking the ring in place. Still another method of locking the segments in proper alignment is shown in Figure 2, wherein the segment ends 109 are straight and lie in a plane passing through the axis of the ring, a hole 101 being drilled in the ring so that preferably one-half of the hole will lie in one segment and the other half will lie in the adjacent segment. There are provided, of course, preferably three of these holes. Each hole 101 may then receive a ball 102 when the segments are assembled in the casing ring, and the balls will accordingly hold the ring segments against misalignment. Preferably the holes and balls are located at one side of the equator line of the ring so as to be out of registry with the lubricating groove 38 (Fig. 2) in casing 21.

Any suitable interfitting engagement will maintain the plurality of segments in proper alignment and permits mass production thereof without requiring the careful matching demanded in the use of fractured ring segments.

It will thus be seen that the objects set forth above, among those made apparent from the preceding description, are efficiently attained and, since certain changes may be made in the above construction and the different embodiments of the invention illustrated in the drawings, as well as in the steps of carrying out the above process, without departing from the scope thereof, it is intended that all matter contained in the above description and shown in the accompanying drawings shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

I claim:

A self-aligning bearing comprising, in combination, a one-piece metallic casing ring having a circular bore defined by a concave internal seating surface substantially coinciding with the curved surface of a spherical medial zone; a transversely-sectioned race ring of metallic bearing material comprising successive segments thereof arranged end to end and having a convex external spherical seating surface complementary to said casing ring internal seating surface whereby said race ring may be assembled in said casing ring while permitting said assembled race ring to pivot about any diametrical axis thereof with its general plane swinging to any angle relative to the general plane of said casing ring, said assembled race ring having a concave internal bearing surface coinciding with the curved surface of a smaller spherical medial zone; a one-piece metallic bearing ball having an external spherical bearing surface conforming to and mating with said race ring bearing surface, the periphery of said assembled race ring having one or more holes drilled therein and centered at the dividing lines between segments thereof, and a ball in each of said holes to hold said ring segments against misalignment.

References Cited in the file of this patent

UNITED STATES PATENTS

| 508,787 | Vallin | Nov. 14, 1893 |
| 1,298,100 | Royce | Mar. 25, 1919 |
| 1,356,848 | Bokelund | Oct. 26, 1920 |

(Other references on following page)

UNITED STATES PATENTS

| | | |
|---|---|---|
| 1,630,339 | Ganster | May 31, 1927 |
| 1,736,959 | Gibbons | Nov. 26, 1929 |
| 1,807,373 | Blunt | May 26, 1931 |
| 1,838,582 | Skillman | Dec. 29, 1931 |
| 1,875,682 | Walker | Sept. 6, 1932 |
| 1,906,259 | Gibbons | May 2, 1933 |
| 1,913,204 | Larzelere | June 6, 1933 |
| 1,989,116 | Strauss | Jan. 29, 1935 |
| 2,047,885 | Riebe | July 14, 1936 |
| 2,260,283 | Halford | Oct. 28, 1941 |
| 2,350,482 | Venditty | June 6, 1944 |
| 2,371,399 | Mantle | Mar. 13, 1945 |
| 2,382,349 | Taylor | Aug. 14, 1945 |
| 2,624,645 | Virtue | Jan. 6, 1953 |
| 2,652,293 | Phillips | Sept. 15, 1953 |
| 2,702,216 | Stearns | Feb. 15, 1955 |

FOREIGN PATENTS

| | | |
|---|---|---|
| 249,451 | Italy | July 23, 1926 |